US010815986B2

(12) United States Patent
Zediu et al.

(10) Patent No.: US 10,815,986 B2
(45) Date of Patent: Oct. 27, 2020

(54) BYPASS AND PRESSURE ADJUSTMENT VALVE

(71) Applicant: TECOMEC S.R.L., Reggio Emilia (IT)

(72) Inventors: Paul Marius Zediu, Reggio Emilia (IT); Corrado Tondelli, Albinea (IT)

(73) Assignee: TECOMEC S.R.L., Reggio Emilia (IT)

( * ) Notice: Subject to any disclaimer, the term of this patent is extended or adjusted under 35 U.S.C. 154(b) by 28 days.

(21) Appl. No.: 16/425,249

(22) Filed: May 29, 2019

(65) Prior Publication Data
US 2020/0032787 A1 Jan. 30, 2020

(30) Foreign Application Priority Data
Jul. 30, 2018 (IT) .................. 102018000007616

(51) Int. Cl.
*F04B 49/035* (2006.01)
*B08B 3/02* (2006.01)

(52) U.S. Cl.
CPC ............ *F04B 49/035* (2013.01); *B08B 3/026* (2013.01); *B08B 2203/0205* (2013.01); *Y10T 137/2584* (2015.04)

(58) Field of Classification Search
CPC ......... Y10T 137/7785; Y10T 137/7791; Y10T 137/2584; F04B 49/035; B08B 3/026; B08B 2203/0205; G05D 16/103; G05D 7/0133; G05D 7/014
USPC .................................. 137/115.05, 498, 503
See application file for complete search history.

(56) References Cited

U.S. PATENT DOCUMENTS

| 2,665,704 A * | 1/1954 | Kanuch ............... F15B 13/0417 137/110 |
| 2,858,842 A * | 11/1958 | Reis ..................... F04B 49/035 137/115.26 |
| 3,035,596 A * | 5/1962 | Guinard ............... G05D 7/0126 137/115.05 |
| 3,138,174 A * | 6/1964 | Gilpin .................. G05D 7/0126 137/498 |
| 3,457,941 A * | 7/1969 | Cook ..................... F04C 14/00 137/115.18 |

(Continued)

FOREIGN PATENT DOCUMENTS

| DE | 4221286 | 1/1993 |
| EP | 1054158 | 11/2000 |
| EP | 2093643 | 8/2009 |

*Primary Examiner* — William M McCalister
(74) *Attorney, Agent, or Firm* — Pearne & Gordon LLP

(57) ABSTRACT

A bypass valve, comprising:
  a main conduit (10), comprising a first section (11) and a second section (12);
  a mobile control shutter (21);
  a bypass conduit (30) which places the main conduit (10) in communication with a discharge opening;
  a control element (31), mobile between a closed position, at which it closes the bypass conduit (30), and an open position, at which it opens the bypass conduit;
  a throttle element (40), interposed between the first section (11) and the second section (12), structured to produce a load loss which depends on the fluid flow rate in transit along the main conduit (10).
The control element (31) is tubular-shaped and defines internally a section of the bypass conduit (30). The control element (31) is slidable along a housing (32) provided with a sealing seat (33).
A passageway (34) is predisposed between the control element (31) and the housing (32) which places the first section (11) in communication with the second section (12).

10 Claims, 4 Drawing Sheets

(56) References Cited

U.S. PATENT DOCUMENTS

| | | | | |
|---|---|---|---|---|
| 3,524,465 A | * | 8/1970 | Sadler | F16K 17/048 137/115.06 |
| 3,742,970 A | * | 7/1973 | Gross | F15B 20/005 137/100 |
| 4,171,708 A | * | 10/1979 | Pareja | F16K 17/0406 137/115.04 |
| 4,194,526 A | * | 3/1980 | Stromberg | G05D 9/04 137/356 |
| 4,292,990 A | | 10/1981 | Pareja | |
| 5,035,580 A | * | 7/1991 | Simonette | B08B 3/026 417/34 |
| 5,372,157 A | * | 12/1994 | Benetti | F16K 17/0473 137/110 |
| 5,474,105 A | * | 12/1995 | Able | F16K 17/30 137/462 |
| 5,694,966 A | * | 12/1997 | Holder | G05D 16/10 137/115.11 |
| 5,718,255 A | * | 2/1998 | Gilpatrick | F04B 17/05 137/10 |
| 6,123,509 A | * | 9/2000 | Hung | F04B 49/022 137/565.35 |
| 6,334,458 B1 | * | 1/2002 | Amaduzzi | F04B 49/035 137/115.05 |
| 6,779,987 B2 | * | 8/2004 | Dexter | B08B 3/026 417/299 |
| 8,091,576 B2 | | 1/2012 | Benetti | |
| 8,973,598 B2 | * | 3/2015 | Etter | F16K 17/0473 137/115.06 |
| 2004/0079411 A1 | * | 4/2004 | Davis | B08B 3/026 137/115.16 |
| 2004/0154672 A1 | * | 8/2004 | Liberfarb | G05D 7/005 137/625.64 |
| 2007/0267063 A1 | | 11/2007 | Davis | |
| 2009/0205716 A1 | * | 8/2009 | Benetti | G05D 16/10 137/99 |

\* cited by examiner

BYPASS AND PRESSURE ADJUSTMENT VALVE

The object of the present invention is a bypass and pressure adjustment valve. In particular, such valve finds useful application for use inside hydraulic circuits for high-pressure washing.

High-pressure washing systems generally comprise a piston pump, intended to bring a washing fluid under pressure, a valve of the type in question and a dispensing gun, provided with a lever tap that is predisposed so as to allow an operator to control the dispensing of the fluid.

Unless electrical devices are provided for automatically turning off the pump, it operates continuously and thus also remains in operation when the gun is closed by the operator. Given the incompressibility of the fluid, it must be discharged into a low-pressure tank through a bypass conduit, or recirculated to the pump. The opening of this conduit is controlled by means of a bypass valve, which is activated upon the closing of the gun.

Bypass valves are known that operate as a function of the washing fluid flow rate directed to the dispensing gun. This type of valve is provided with a device intended to cause a load loss in the fluid that passes through it. A shutter is predisposed to determine the closure of the bypass branch in response to an increase in pressure (water hammer) due to the closure of the gun. A lower pressure on the gun side, which is determined when the gun is in the open position, maintains the shutter in the closed position, so that the fluid cannot enter the bypass conduit. A higher pressure, which is determined when the gun is closed, causes the opening of the shutter and the bypass conduit, and the consequent discharge of the fluid.

In this type of valve, the delivery conduit, i.e. the fluid outlet conduit, is in connection with the bypass even when the gun is closed, such that the peak in pressure generated by the interruption of the flow does not remain trapped, but can be discharged through the bypass port which opens in response to the lack of flow.

An example of the type of valve summarised above is described in the document EP2093643. In this valve, the load loss required to control the shutter of the bypass conduit is constituted by an auxiliary shutter, crossed by a through hole, mobile inside the main conduit of the valve and pushed to abut against a throttle element by means of a spring. The throttle element splits the main conduit of the valve into two sections, each of which is placed in communication with a respective side of the bypass shutter.

When a fluid flow rate transits along the main conduit, a pressure is produced on the auxiliary shutter which exerts a thrust on the auxiliary shutter dependent on the flow rate in transit. The shutter is therefore distanced from the throttle element and opens an outflow surface which varies with the flow rate. The through hole with small diameter which passes through the auxiliary shutter serves to ensure the fluid communication between the two sections of the main conduit in the absence of fluid flow rate, i.e. when the auxiliary shutter abuts against the throttle element in the closed position.

The valve described above has a disadvantage, linked to the presence of the through hole in the auxiliary shutter. In fact, this through hole requires a very accurate calibration. In practice, the through hole should have the smallest possible diameter in order to ensure a rapid response to the opening of the gun, and to determine the peak in pressure which serves to ensure the opening of the bypass conduit. On the other hand, if the diameter is too small then the through hole tends to become clogged with considerable frequency, preventing the opening of the bypass conduit with the closure of the gun.

The object of the present invention is to provide a bypass valve that allows overcoming the drawbacks of the currently available valves, eliminating the presence of the through hole in the auxiliary shutter.

Characteristics and advantages of the present invention will more fully emerge from the following detailed description of an embodiment of the invention, as illustrated in a non-limiting example in the accompanying figures, in which.

Figure 1:
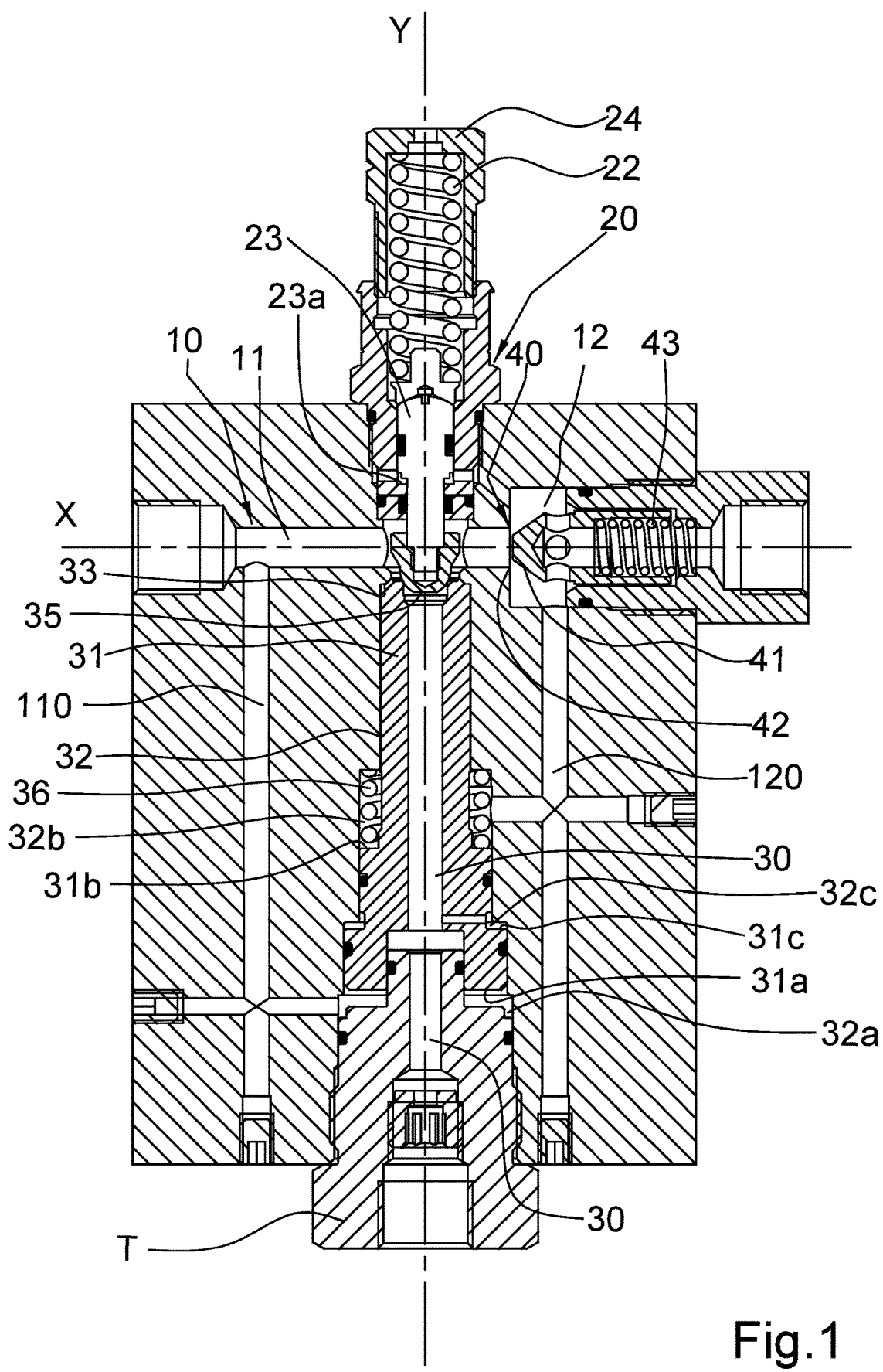
FIG. 1 shows a schematic view of the valve according to the present invention, in a first operating configuration.

The valve according to the present invention comprises a main conduit (10), which in turn comprises a first section (11) and a second section (12). The first section (11) is intended to receive pressurised fluid, for example sent by a pump. The second section (12) is intended to send the fluid to a user, for example a dispensing gun equipped with a control for opening and closing.

The valve also comprises a mobile control shutter (21). Preferably, but not necessarily, the control shutter (21) is associated with a pressure regulator (20), arranged along the main conduit (10). This pressure regulator, which will be better described hereinafter, is provided with the control shutter (21) in order to allow adjusting the pressure of the fluid which reaches the second section (12) of the main conduit (10).

The valve further comprises a bypass conduit (30), which places the main conduit (10) in communication with a discharge opening. In substance, the bypass conduit diverts all or part of the flow rate that flows along the main conduit (10) towards a discharge.

A control element (31) is mobile between a closed position, at which it closes the bypass conduit (30), and an open position, at which it opens the bypass conduit, allowing the total or partial outflow of the fluid towards a discharge.

The control element (31) is mobile between its open and closed positions by means of the pressures present in the first and second sections (11,12) of the main conduit (10). Preferably, the displacement of the control element (31) is determined by the difference between the pressures present in the first and second sections (11,12) of the main conduit (10).

In the embodiment depicted, the valve comprises a first piloting conduit (110), which places the first section (11) in communication with a first piloting side of the control element (31), in order to pilot the control element (31) towards the closed position. In substance, the thrust produced by the pressure present in the first section (11) pushes the control element (31) towards the closed position.

A second piloting conduit (120) is predisposed to place the second section (12) in communication with a second piloting side of the control element (31), in order to pilot the control element (31) towards the open position. In substance, the thrust produced by the pressure present in the second section (12) pushes the control element (31) towards the open position.

The valve further comprises a throttle element (40), interposed between the first section (11) and the second section (12). The throttle element (40) comprises an auxiliary shutter (41) and a sealing seat (42). The shutter (41) is mobile between a rest position, in which it is in contact with the sealing seat (42), and an active position, in which it is distanced from the sealing seat (42) and allows the flow of fluid. An elastic means (43), for example a spring, is predisposed to push the shutter (41) towards the sealing seat (42). The fluid flow rate in transit along the main conduit (10) pushes the shutter (41) towards the active position, distancing it from the sealing seat (42).

The throttle element (40) is structured to produce a load loss which depends on the fluid flow rate in transit along the main conduit (10). The greater the flow rate in transit along the main conduit (10), for example in an open condition of the dispensing gun, the greater the load loss that the throttle element (40) produces between the first and second sections (11,12). The difference in pressure between the first and second sections (11,12) is in any case sufficient to keep the control element (31) in the closed position. Vice versa, in a condition of zero flow rate, the pressure difference between the first and second sections (11,12) is cancelled and the control element (31) moves and keeps its open position. The displacement of the control element (31) in the open position can be facilitated by the presence of an elastic means (36) that pushes the control element (31) towards the open position.

The control element (31) is tubular-shaped and defines internally a section of the bypass conduit (30). Furthermore, the control element (31) is slidable along a housing (32) provided with a sealing seat (33).

A passageway (34) is predisposed between the control element (31) and the housing (32) which allows the passage of fluid and places the first section (11) in communication with the second section (12). In the closed position, the control element (31) is in contact with the sealing seat (33) and the control shutter (21) and closes the passageway (34) to the passage of fluid. In the open position, the control element (31) is instead detached from the sealing seat (33) and frees the passageway (34), enabling a flow of fluid. As will be explained hereinafter, the passageway (34) replaces the through hole present in the known type of valves.

The control shutter (21) is able to perform a short stroke, of such a length as to allow the control element (31) to become detached from the sealing seat (33) while the control shutter (21) is in contact with the control element (31), occluding the bypass conduit (30).

The operation of the valve takes place in the following ways.

Figure 1A:
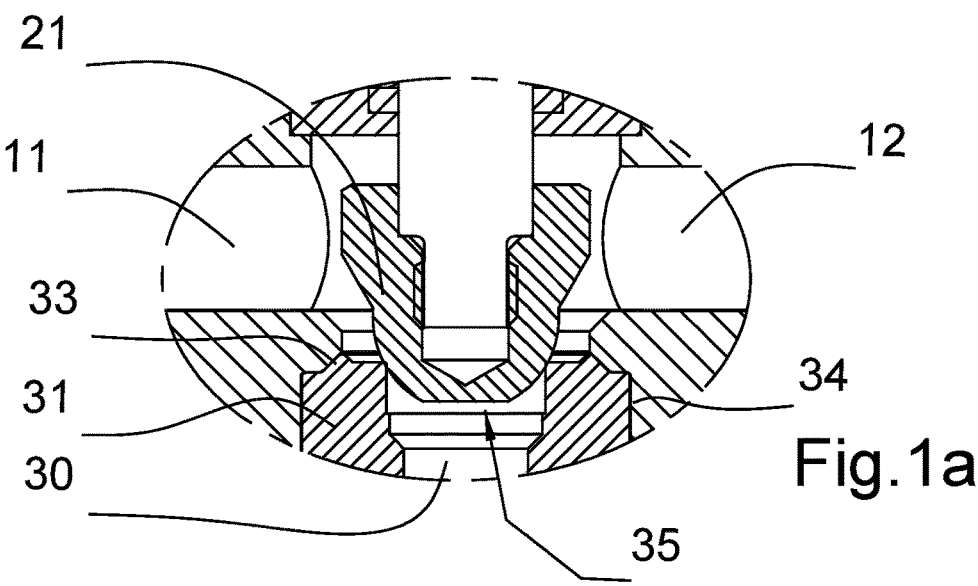
FIG. 1a shows an enlargement of a zone of FIG. 1.

Consider an initial configuration in which the supply pump is operating and the fluid dispensing gun is open. In these conditions, shown in FIGS. 1 and 1a, the bypass valve is in the closed configuration, i.e. the control element (31) occludes the bypass duct (30). This is due to the fact that the fluid flow rate transiting through the throttle element (40) undergoes a load loss and the pressure difference which is created between the first section (11) and the second section (12) of the main conduit (10) maintains the control element (31) in contact with the sealing seat (33) and the control shutter (21). The bypass conduit (30) is therefore closed and the entire flow rate flows from the first section (11) to the second section (12).

Figure 2A:
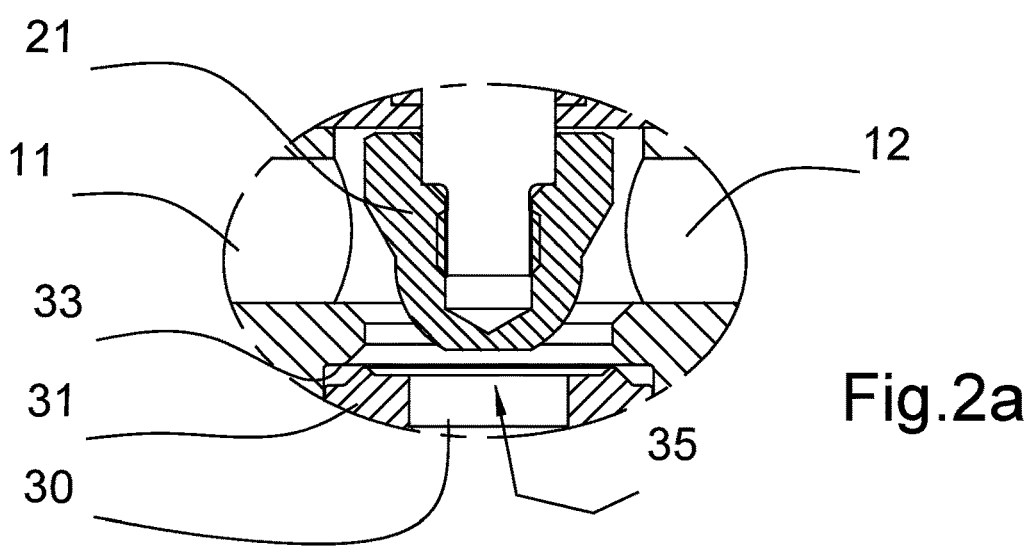
FIG. 2a shows an enlargement of a zone of FIG. 2.
Figure 2:
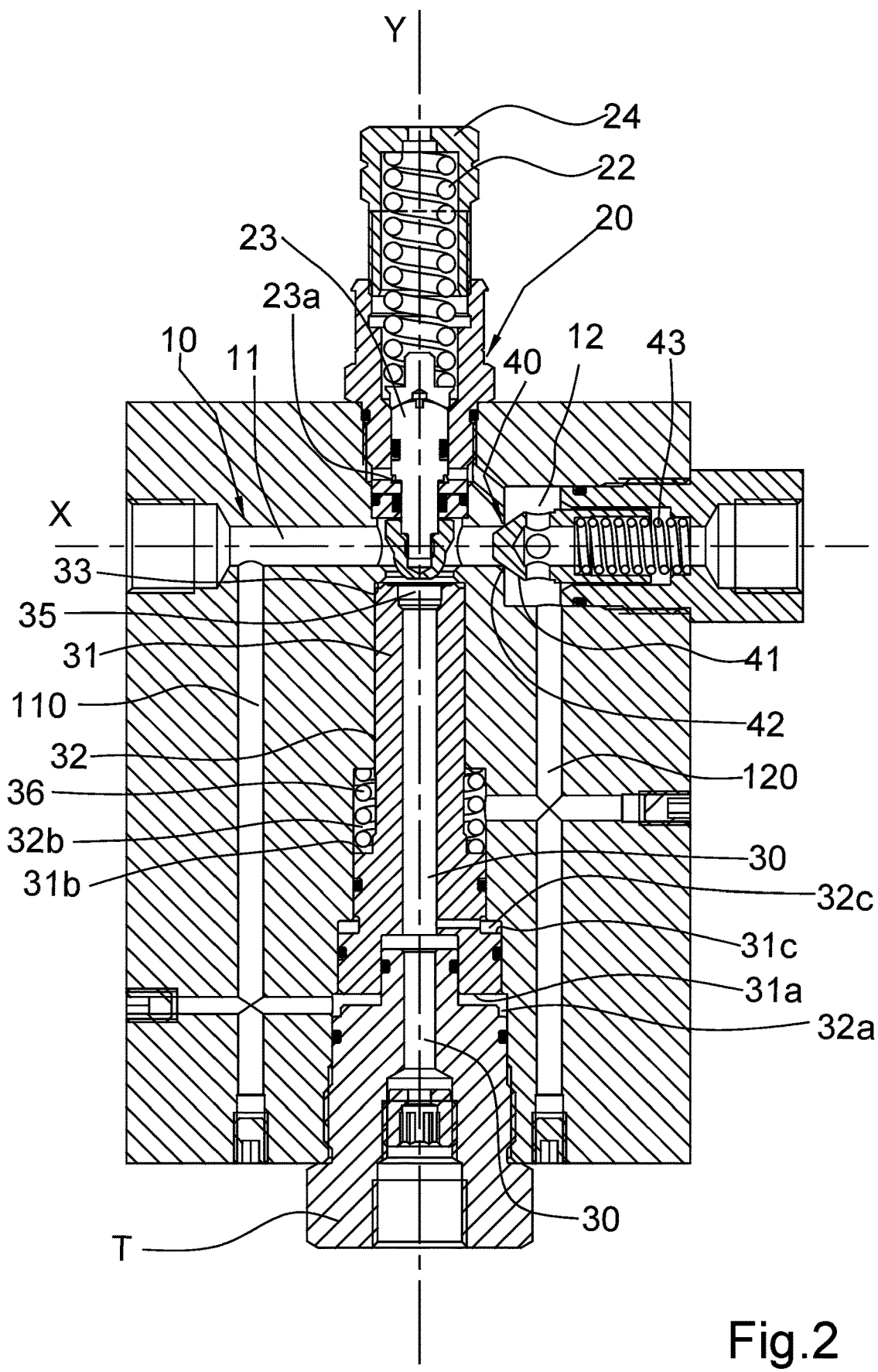
FIG. 2 shows the valve of FIG. 1 in a second operating configuration.

With the closure of the dispensing gun, the flow rate through the throttle element (40) is cancelled, the shutter (41) moves into the closed position in contact with the throttle element (40), and it produces a pressure peak in the second section (12). This entails that the control shutter (21) raises towards the open position, freeing the bypass conduit (30). This allows a rapid lowering of the pressure in the first section (11). Subsequently the control element (31) moves from the closed position towards the open position, freeing the passageway (34), as shown in FIGS. 2 and 2a. The pressure present in the second section (12) can be discharged through the passageway (34), and from this through the bypass conduit (30). In other words, the passageway (34) maintains a communication between the first section (11) and the second section (12), allowing the discharge of the pressure present in the second section (12), similar to the through hole of the known type of valves. The passageway (34), on the other hand, cannot be occluded by impurities or other particles.

Figure 3A:
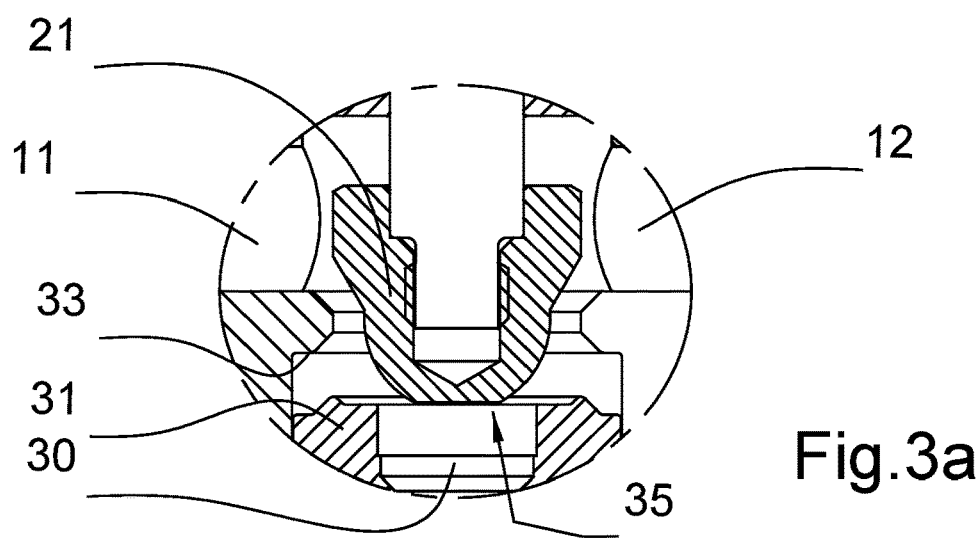
FIG. 3a shows an enlargement of a zone of FIG. 3.
Figure 3:
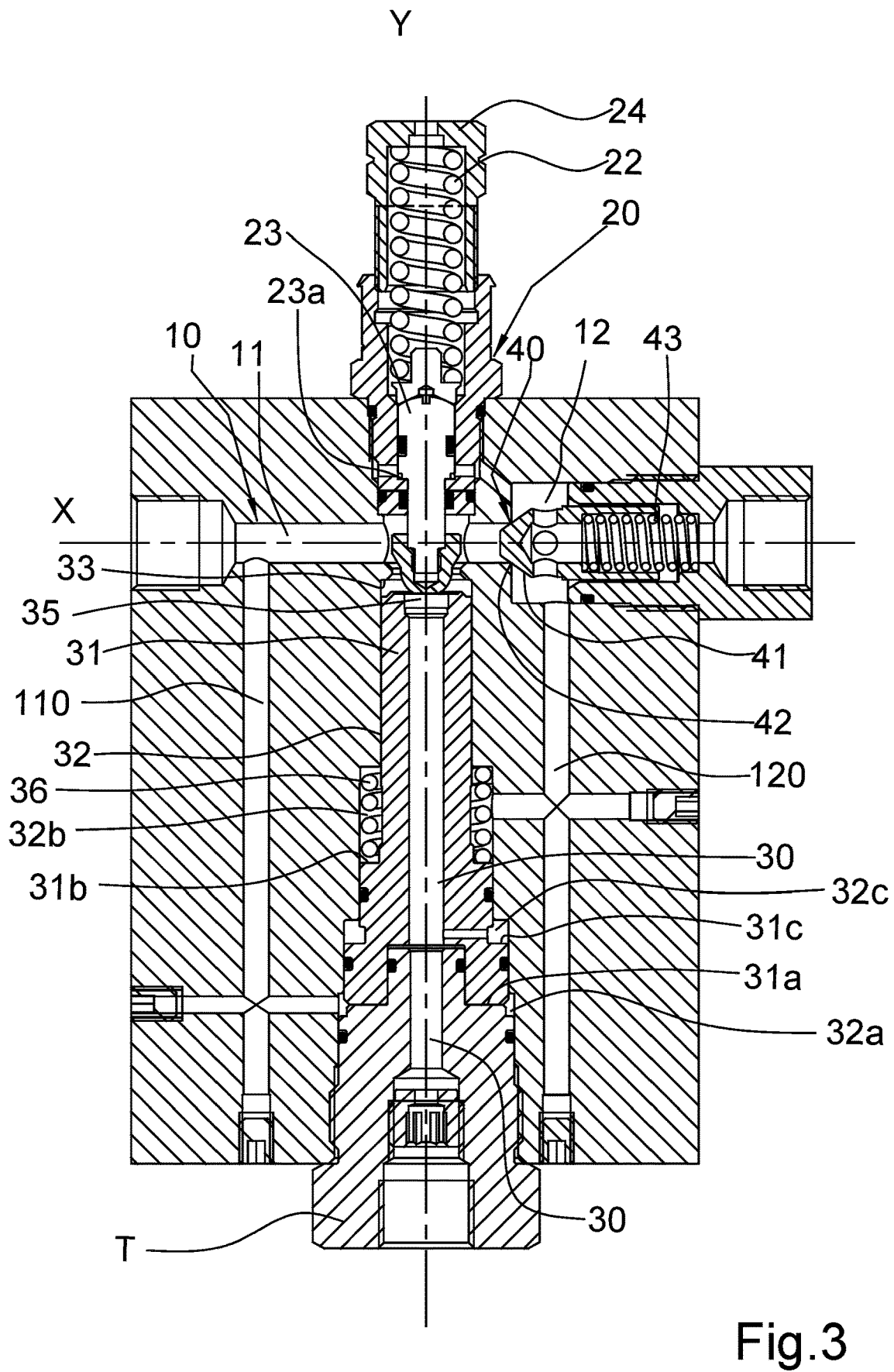
FIG. 3 shows the valve of FIG. 1 in a third operating configuration.

The configuration in which the dispensing gun is closed, with the pump operating, is illustrated in FIGS. 3 and 3a. The control element (31) is detached from both the sealing seat (33) and the control shutter (21).

Starting from the configuration of FIG. 3, bringing the gun in the open position produces a drop in pressure in the second section (12) of the main conduit (10). The pressure difference between the first section (11) and the second section (12) pushes the control element (31) from the open position towards the closed position. The control element (31) first comes into contact with the control shutter (21), closing the bypass conduit (30). The control element (31) then continues its stroke towards the closed position, also pushing the control shutter (21) that maintains the bypass conduit (30) closed, until it makes contact with the sealing seat (33), also closing the passageway (34).

To determine the displacement of the control element (31), the housing (32) has a first chamber (32a), placed in communication with the first piloting conduit (110) and closed at an end thereof by a first piloting surface (31a) of the control element (31). The pressure present in the first chamber (32a) produces a thrust on the first piloting surface (31a) of the control element (31) that pushes the latter towards the closed position. In substance, the first chamber (32a) is delimited by the first piloting surface (31a), by a section of the side wall of the housing (32), and on the bottom by a bottom wall of the housing (32), or by a plug (T) for closing the housing (32). The plug (T) is crossed by a section of the bypass conduit (30).

The housing (32) also has a second chamber (32b) placed in communication with the second piloting conduit (120). The second chamber (32b) is closed at an end thereof by a second piloting surface (31b) of the control element (31). The pressure present in the second chamber (32b) produces a thrust on the second piloting surface (31b) that pushes the control element (31) towards the open position. In the solution shown, the second chamber (32b) is concentric to the control element (31) and is delimited, at the ends thereof, by the second piloting surface (31b) and by a shoulder of the housing (32), while it is laterally delimited by a section of the side wall of the housing (32). The second chamber (32b) is also placed in communication with the passageway (34).

An elastic means (36), for example a spring, is arranged inside the second annular chamber (32b) to exert an elastic thrust on the second piloting surface (31b), or in order to push the control element (31) towards the open position. In the absence of a difference in pressure between the first section (11) and the second section (12), i.e. in conditions of zero flow along the second section (12), the elastic means (36) pushes and holds the control element (31) in the open position.

Preferably the housing (32) has a third chamber (32c), placed in communication with the bypass conduit (30). The third chamber (32c) is closed at an end thereof by a third piloting surface (31c) of the control element (31), while at the other end thereof it is closed by a shoulder of the housing (32). The third chamber (32c) is concentric to the control element (31) and is interposed between the first and second chambers (32a,32b).

In the embodiment shown, the bypass conduit is concentric to a longitudinal axis (Y) and is arranged transversely with respect to the main conduit (10). The latter extends along a flow direction (X) perpendicular to the longitudinal axis (Y).

The control element (31) and the housing (32) have a cylindrical shape and are concentric to the longitudinal axis (Y). As already indicated, the bypass conduit has at least one section arranged through the control element (31), concentrically with respect to the longitudinal axis (Y). In particular, the section of the bypass conduit defined inside the control element (31) has an inlet opening (35) facing towards the sealing seat (33). The shutter (21), the sealing seat (33) and the inlet opening (35) are concentric to the longitudinal axis (Y), and are therefore mutually concentric.

Preferably, the sealing seat (33) is arranged transversely to the main conduit (10), i.e. it opens on the side wall of the main conduit (10).

As already indicated, the control shutter (21) is able to perform a short stroke, of such a length as to allow the control element (31) to become detached from the sealing seat (33) while the control shutter (21) is in contact with the control element (31), occluding the bypass conduit (30). In the embodiment shown, the shutter (21) is arranged in such a way as to occlude the section of the bypass conduit defined inside the control element (31) in the closed position of the control element (31). The control shutter (21) is pushed towards the control element (31) by means of an elastic means (22).

Advantageously, the control shutter (21) is associated with a pressure regulator (20), predisposed to limit the pressure inside the second section (12) of the main conduit (10). In substance, the shutter (21) is mobile towards the control element (31) and towards a closed position of the bypass conduit (30) by means of the elastic means (22), while it is mobile towards an open position of the bypass conduit (30) by means of a thrust exerted by the fluid pressure in the second section (12), i.e. downstream of the throttle element (40).

To this end, the control shutter (21) is associated with a plunger (23) which is sealedly mobile inside a sliding seat. This sliding seat has a piloting chamber which, at one end thereof, is closed by a piloting surface (23a) of the plunger (23). The piloting chamber is placed in communication with the second section (12) of the main conduit (10). The pressure present in the second section (12), through the piloting chamber, exerts a thrust on the piloting surface (23a) which tends to move the plunger (23) and the control shutter (21) towards the open position, in which the control shutter (21) is detached from the control element (31) and the bypass conduit (30) is in communication with the main conduit (10).

The pressure regulator (20) is predisposed to intervene in the event of an increase in pressure in the second section (12). If the pressure in the second section (12) remains below a predetermined value, the control shutter (21) is maintained in the closed position, in contact with the control element (31), by the thrust exerted by the elastic means (22). In the closed position the control shutter (21) closes the inlet opening (35) of the bypass conduit (30).

If the pressure in the second section (12) exceeds the predetermined threshold value, the plunger (23) is pushed towards the open position by the thrust which is exerted on the piloting surface (23a), moving the control shutter (21) towards the open position. The control shutter (21) therefore detaches from the control element (31), i.e. it frees the inlet opening (35) of the bypass conduit (30), allowing the discharge of the fluid through the bypass conduit (30). This allows a lowering of the pressure in the second section (12). When the pressure in the second section (12) returns below the predetermined threshold value, the thrust exerted by the elastic means (22) brings the control shutter (21) in the closed position, occluding the bypass conduit (30). The predetermined threshold pressure can be adjusted by changing the thrust exerted by the elastic means (22). In the embodiment shown, the elastic means (22) consists of a spring and the threshold pressure can be adjusted by changing the pre-load of the spring, for example by means of a screwable knob (24).

The invention claimed is:

1. A bypass valve, comprising:
    a main conduit (10), comprising a first section (11) and a second section (12);
    a mobile control shutter (21);
    a bypass conduit (30) which places the main conduit (10) in communication with a discharge opening;
    a control element (31), mobile between a closed position, at which it closes the bypass conduit (30), and an open position, at which it opens the bypass conduit;
    a first piloting conduit (110), which places the first section (11) in communication with a first piloting side of the control element (31), in order to pilot the control element (31) towards the closed position;
    a second piloting conduit (120), which places the second section (12) in communication with a second piloting side of the control element (31), in order to pilot the control element (31) towards the open position;
    a throttle element (40), interposed between the first section (11) and the second section (12), structured to produce a load loss which depends on the fluid flow rate in transit along the main conduit (10);
    characterised in that:
    the control element (31) is tubular-shaped and defines internally a section of the bypass conduit (30);
    the control element (31) is slidable along a housing (32) provided with a sealing seat (33);
    a passageway (34) is predisposed between the control element (31) and the housing (32) which places the first section (11) in communication with the second section (12);
    in the closed position, the control element (31) is in contact with the sealing seat (33) and the shutter (21);
    in the open position, the control element (31) is detached from the sealing seat (33) and frees the passageway (34), enabling a flow of fluid.

2. The valve according to claim 1, wherein the shutter (21) of the pressure regulator (20) is arranged in such a way as to occlude the section of the bypass conduit defined inside the control element (31) in the closed position of the control element (31).

3. The valve according to claim 2, wherein the section of the bypass conduit defined inside the control element (31) has an inlet opening (35) facing towards the sealing seat (33).

4. The valve according to claim 3, wherein the shutter (21) of the pressure regulator (20), the sealing seat (33) and the inlet opening (35) are mutually concentric.

5. The valve according to claim 1, wherein:
the housing (32) has a first chamber (32a), placed in communication with the first piloting conduit (110) and closed at an end by a first piloting surface (31a) of the control element (31);
the housing (32) has a second chamber (32b), concentric to the control element (31) and placed in communication with the second piloting conduit (120);
the second chamber (32b) is closed at an end thereof by a second piloting surface (31b) of the control element (31).

6. The valve according to claim 5, comprising an elastic means (36), arranged inside the annular second chamber (32b), which exerts an elastic thrust on the second piloting surface (31b).

7. The valve according to claim 5, wherein: the housing (32) has a third chamber (32c), concentric to the control element (31) and placed in communication with the bypass conduit (30); the third chamber (32c) is closed at an end thereof by a third piloting surface (31c) of the control element (31).

8. The valve according to claim 5, wherein the passageway (34) is in communication with the second chamber (32b).

9. The valve according to claim 1, wherein: the throttle element (40) comprises a shutter (41) and a sealing seat (42); the shutter (41) is mobile between a rest position, in which it is in contact with the sealing seat (42) and prevents the flow of fluid, and an active position, in which it is distanced from the sealing seat (42) and enables the flow of fluid; an elastic means (43) is predisposed to push the shutter (41) towards the sealing seat (42).

10. The valve according to claim 1, wherein the shutter (21) of the pressure regulator (20) is mobile towards a closed position of the bypass conduit (30) by an elastic means (22), while the shutter (21) is mobile towards an open position of the bypass conduit (30) by thrust exerted by the fluid pressure downstream of the throttle element (40).

* * * * *